US009033672B2

(12) United States Patent
Baucke et al.

(10) Patent No.: US 9,033,672 B2
(45) Date of Patent: May 19, 2015

(54) WIND TURBINES AND WIND TURBINE ROTOR BLADES WITH REDUCED RADAR CROSS SECTIONS

(75) Inventors: Russell Craig Baucke, Loveland, OH (US); John Matthew Prescott, Covington, KY (US); Lesly Sue Walters, Forest Park, OH (US)

(73) Assignee: General Electric Company, Schenectady, NY (US)

( * ) Notice: Subject to any disclaimer, the term of this patent is extended or adjusted under 35 U.S.C. 154(b) by 550 days.

(21) Appl. No.: 13/348,589

(22) Filed: Jan. 11, 2012

(65) Prior Publication Data
US 2013/0177435 A1 Jul. 11, 2013

(51) Int. Cl.
*F03D 11/00* (2006.01)
*F03D 1/06* (2006.01)
*H01Q 17/00* (2006.01)

(52) U.S. Cl.
CPC ............. *F03D 1/0675* (2013.01); *H01Q 17/00* (2013.01); *Y02E 10/721* (2013.01); *F05B 2260/99* (2013.01)

(58) Field of Classification Search
USPC ... 416/223 R, 229 R, 230 R, 233, 232, 241 R
See application file for complete search history.

(56) References Cited

U.S. PATENT DOCUMENTS

| 5,151,222 | A | 9/1992 | Ruffoni |
| 5,202,701 | A * | 4/1993 | Casey ............................ 343/909 |
| 7,841,835 | B2 | 11/2010 | Bagepalli et al. |
| 7,927,077 | B2 | 4/2011 | Olson |
| 2004/0048027 | A1 | 3/2004 | Hayes et al. |
| 2004/0048939 | A1* | 3/2004 | Kuehl ............................ 521/142 |
| 2010/0271253 | A1* | 10/2010 | Shah et al. ........................ 342/2 |
| 2010/0296940 | A1* | 11/2010 | Zuteck ........................... 416/226 |
| 2011/0223031 | A1 | 9/2011 | Bond |

FOREIGN PATENT DOCUMENTS

| GB | 2473020 | * | 3/2011 |
| WO | 2011024009 | A1 | 3/2011 |
| WO | 2011051687 | A2 | 5/2011 |
| WO | 2011138597 | A2 | 11/2011 |

* cited by examiner

*Primary Examiner* — Edward Look
*Assistant Examiner* — Maxime Adjagbe
(74) *Attorney, Agent, or Firm* — Blake A. Nickels; Ernest G. Cusick; Frank A. Landgraff

(57) ABSTRACT

Wind turbine rotor blades with a reduced radar cross sections include a shell having a leading edge opposite a trailing edge, a structural support member that supports the shell and is disposed internal the wind turbine rotor blade between the leading edge and the trailing edge and extends for at least a portion of a rotor blade span length, wherein the structural support member comprises fiberglass, one or more cavities internal the wind turbine rotor blade, and a lightweight broadband radar absorbing filler material disposed in at least one of the one or more cavities to provide the reduced radar cross section.

19 Claims, 4 Drawing Sheets

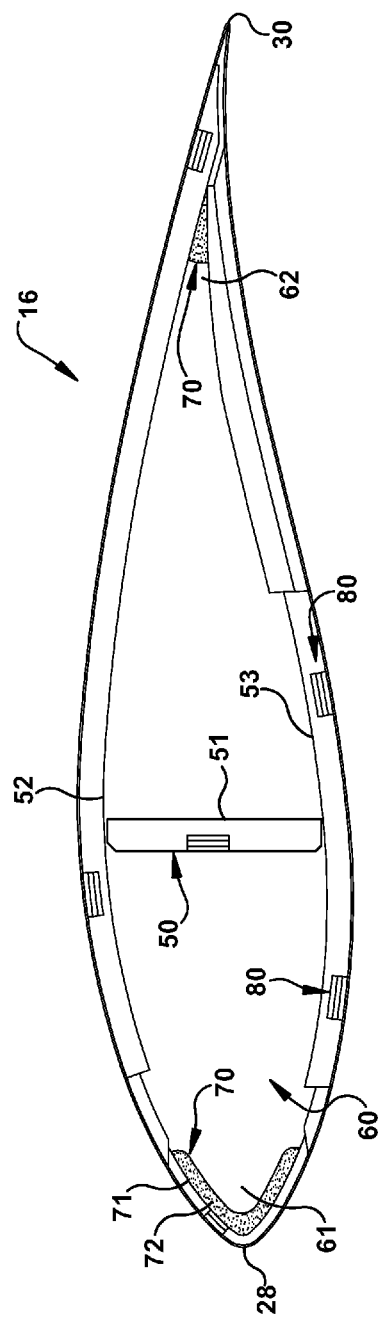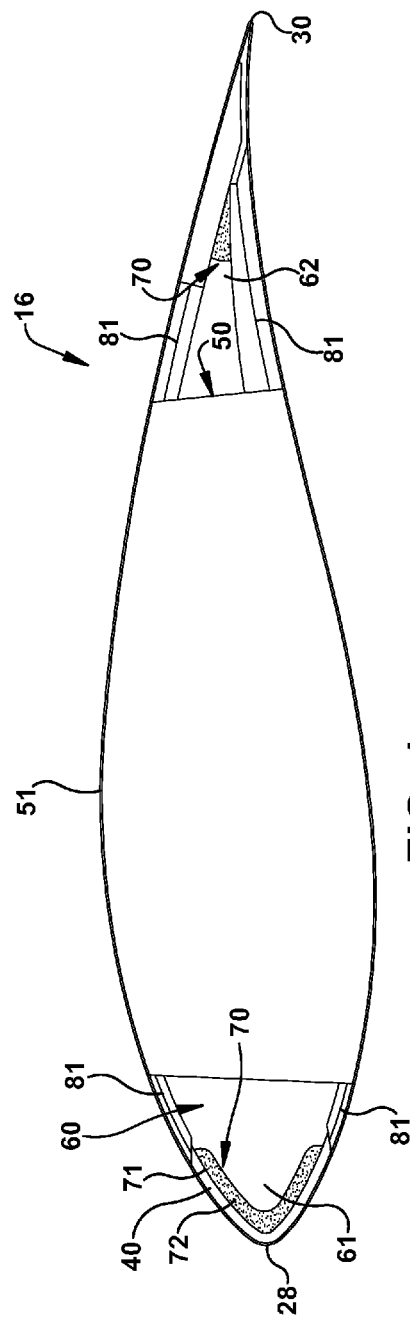

WIND TURBINES AND WIND TURBINE ROTOR BLADES WITH REDUCED RADAR CROSS SECTIONS

CROSS REFERENCE TO RELATED APPLICATION

This application is related to Ser. No. 13/348,595, filed concurrently herewith on Jan. 11, 2012, which is fully incorporated herein by reference and made a part hereof.

BACKGROUND OF THE INVENTION

The subject matter disclosed herein relates to wind turbines and, more specifically, to wind turbines and wind turbine rotor blades with reduced radar cross sections.

Wind power can be considered one of the cleanest, most environmentally friendly energy sources presently available, and wind turbines have gained increased attention in this regard. A wind turbine can include a tower, generator, gearbox, nacelle, and one or more rotor blades comprising a composite material. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbines can thus be placed in a variety of locations to effectively help capture the energy of wind power where present. These locations can include both on-shore and off-shore locations and may potentially be located in a wide variety of different topographical and geological positions. However, some position-based restrictions may inhibit the feasibility of placing wind turbines and certain locations. For example, radar stations and the like, such as those used at many airports, utilize open areas to capture radar feedback over great distances to monitor various activities such as air traffic. Placing wind turbines near such radar stations may result in consistent or occasional radar feedback due to the radar cross section of one or more components of the wind turbines and thereby impede the monitoring of space on the opposite side of such wind turbines.

Accordingly, alternative wind turbines and wind turbine rotor blades with reduced radar cross section would be welcome in the art.

BRIEF DESCRIPTION OF THE INVENTION

In one embodiment, a wind turbine rotor blade with a reduced radar cross section is provided. The wind turbine rotor blade includes a shell having a leading edge opposite a trailing edge, a structural support member that supports the shell and is disposed internal the wind turbine rotor blade between the leading edge and the trailing edge and extends for at least a portion of a rotor blade span length, wherein the structural support member comprises fiberglass, and one or more cavities internal the wind turbine rotor blade. The wind turbine rotor blade further includes a lightweight broadband radar absorbing filler material disposed in at least one of the one or more cavities to provide the reduced radar cross section.

In another embodiment, a wind turbine rotor blade with a reduced radar cross section is provided. The wind turbine rotor blade includes a shell having a leading edge opposite a trailing edge and a structural support member that supports the shell and is disposed internal the wind turbine rotor blade between the leading edge and the trailing edge and extends for at least a portion of a rotor blade span length, wherein the structural support member comprises carbon fiber. The wind turbine rotor blade further includes a plurality of stacked resistive layers disposed at one or more locations about the structural support member to provide the reduced radar cross section.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

FIG. 3 is a cross section view of a fiberglass based wind turbine rotor blade according to one or more embodiments shown or described herein;

FIG. 4 is a cross section view of a carbon fiber based wind turbine rotor blade according to one or more embodiments shown or described herein;

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Wind turbines and wind turbine rotor blades with reduced radar cross sections are disclosed herein. In particular, lightweight broadband radar absorbing filler material and/or stacked resistive layers can be incorporated into wind turbine rotor blades to provide relatively broad or targeted radar absorption. For example, the lightweight broadband radar absorbing filler material can be disposed in one of a plurality of cavities internal the wind turbine rotor blade to reduce the radar cross section across a relatively broad spectrum without significantly affecting the weight or balance of the wind turbine rotor blade. Similarly, a plurality of stacked resistive layers can be incorporated into the wind turbine rotor blade at one or more locations such as the structural support member or the shell. When stacked resistive layers are disposed at multiple locations, different locations may be tuned to reduce the radar cross section at different frequencies. Incorporating one or more of these features can allow the same wind turbine rotor blade to be disposed in different geographical areas that use different radar bands while still providing a reduced radar cross section.

Figure 1:
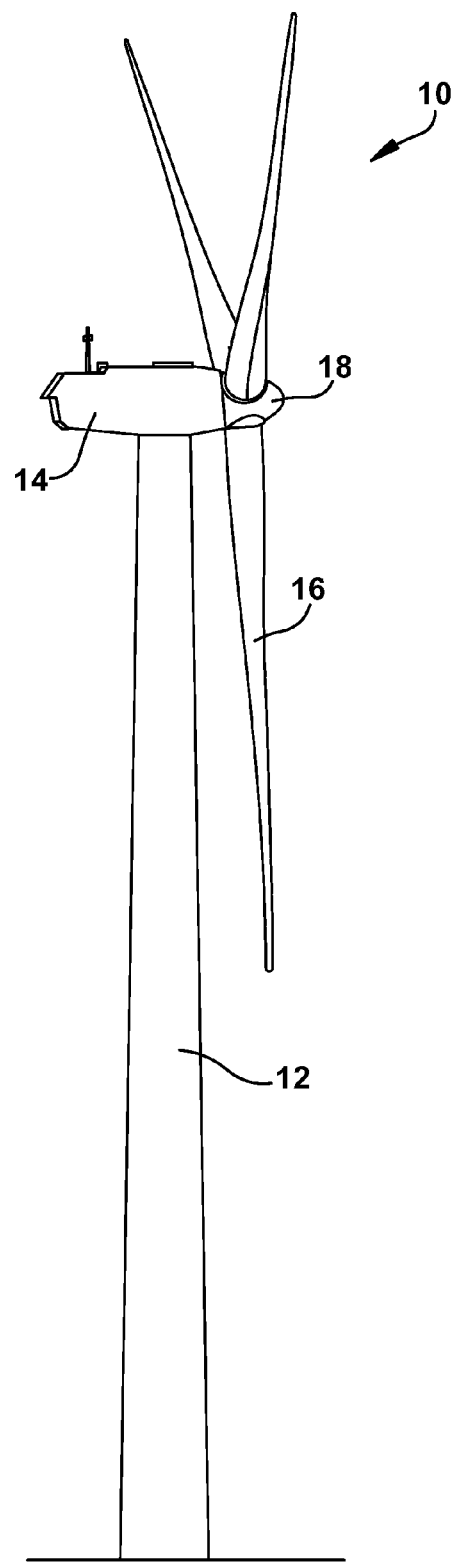
FIG. 1 is a perspective view of a wind turbine according to one or more embodiments shown or described herein.

Referring now to FIG. 1, a perspective view of a wind turbine 10 is illustrated. The wind turbine 10 can generally comprise a nacelle 14 mounted on a tower 12. A plurality of wind turbine rotor blades 16 can be mounted to a rotor hub 18 which can be connected to a main flange that turns a main rotor shaft (not illustrated). The wind turbine power generation and control components can be housed within the nacelle 14. It should be appreciated that the wind turbine 10 illustrated in FIG. 1 is provided for illustrative purposes only and not intended to limit the application of this disclosure to a specific wind turbine type or configuration.

Figure 2:
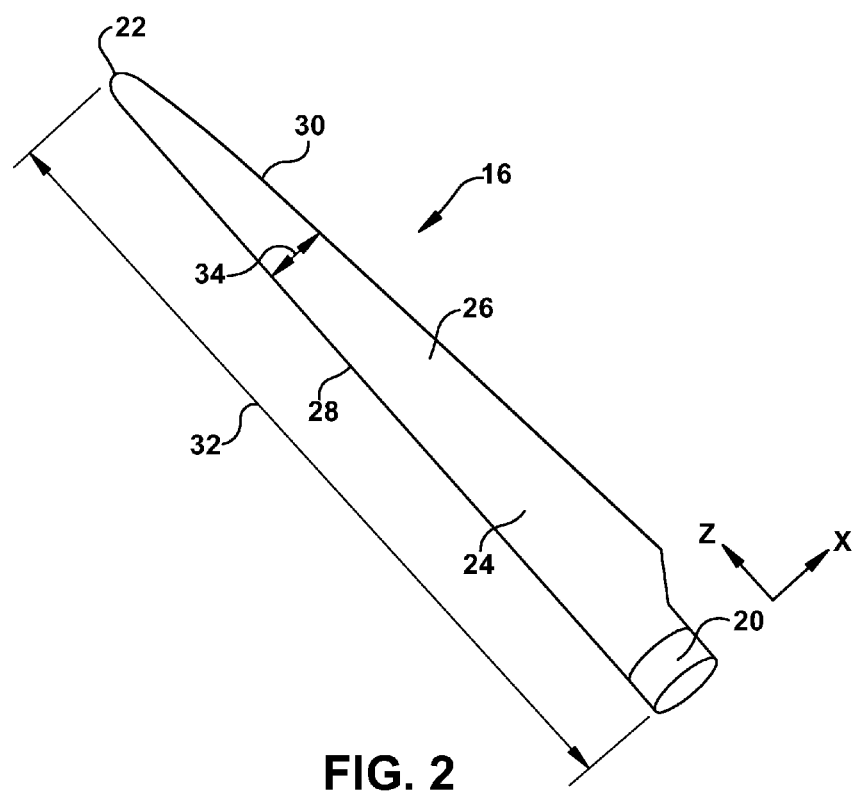
FIG. 2 is a perspective view of a wind turbine rotor blade according to one or more embodiments shown or described herein.

Referring now to FIG. 2, a perspective view of a wind turbine rotor blade 16 is illustrated. The wind turbine rotor blade 16 can include a blade root 20 for mounting the wind turbine rotor blade 16 to a mounting flange (not illustrated) of the wind turbine hub 18 (illustrated in FIG. 1) and a blade tip 22 disposed opposite the blade root 20. The wind turbine rotor blade 16 may comprise a pressure side 24 and a suction side 26 extending between a leading edge 28 and a trailing edge 30. In addition, the wind turbine rotor blade 16 may include a rotor blade span length 32 defining the total length between the blade root 20 and the blade tip 22. The wind turbine rotor blade 16 can further comprise a chord 34 defining the total length between the leading edge 28 and the trailing edge 30. It should be appreciated that the chord 34 may vary in length with respect to the rotor blade span length 32 as the wind turbine rotor blade 16 extends from the blade root 20 to the blade tip 22.

The wind turbine rotor blade 16 may define any suitable aerodynamic profile. Thus, in some embodiments, the wind turbine rotor blade 16 may define an airfoil shaped cross-section. For example, the wind turbine rotor blade 16 may also be aeroelastically tailored. Aeroelastic tailoring of the wind turbine rotor blade 16 may entail bending the wind turbine rotor blade 16 in generally a chordwise direction. The chordwise direction generally corresponds to a direction parallel to the chord 34 defined between the leading edge 28 and the trailing edge 30 of the wind turbine rotor blade 16. Additionally, the spanwise direction generally corresponds to a direction parallel to the rotor blade span length 32 of the wind turbine rotor blade 16. In some embodiments, aeroelastic tailoring of the wind turbine rotor blade 16 may additionally or alternatively comprise twisting the wind turbine rotor blade 16, such as by twisting the rotor blade 16 in generally the chordwise direction and/or the spanwise direction.

Referring now to FIGS. 3 and 4, the cross sections of wind turbine rotor blades 16 are illustrated. The structure of the wind turbine rotor blade 16 can generally comprise a shell 40 and a structural support member 50 disposed within the shell 40. As illustrated in FIGS. 2 and 3, the shell 40 can comprise the leading edge 28 opposite the trailing edge 30. The shell 40 can comprise any material that allows for the capture of incoming wind for rotating the wind turbine rotor blade 16 while being able to be supported by the structural support member 50. For example, in some embodiments the shell 40 can comprise a composite material. In some embodiments, the shell 40 can comprise a fiberglass material or a carbon fiber material. In even some embodiments, the shell 40 can comprise a plurality of layers (e.g., a plurality of fiberglass layers) that are connected to one another through adhesives (e.g., glues, tapes, etc.), mechanical fasteners (e.g., screws, bolts, etc.) or the like. While specific embodiments of wind turbine rotor blades 16 have been disclosed herein, it should be appreciated that these embodiments are not intended to be limiting and alternative wind turbine rotor blades 16 (e.g., using additional and/or alternative materials, designs or the like) should also be appreciated.

In some embodiments, the shell 40 can comprise a plurality of layers held together by an adhesive such as an epoxy adhesive. In such embodiments, the amount of adhesive, or similar binder, may vary in amount by location. Thus some locations of the shell 40 may comprise a greater amount (e.g., a thicker amount) of adhesive as a result of the manufacturing and/or assembly process. Furthermore, the adhesive may also interact with radar such that the variations in amounts of adhesive may lead to variations in its radar cross section along the wind turbine rotor blade 16. While epoxy adhesives are specifically identified herein, it should be appreciated that other binders, fasteners or other remnants from manufacturing and/or assembly may similarly be disposed about the wind turbine rotor blade 16 in non-uniform amounts thereby producing variations in radar cross section by location.

Referring to FIGS. 2-4, the structural support member 50 may be disposed within the shell 40 between the leading edge 28 and the trailing edge 30 and extend for at least a portion of the rotor blade span length 32. The structural support member 50 can comprise any supportive member that is directly or indirectly connected to and supporting the shell 40 and may comprise one or more different materials.

For example, as illustrated in FIG. 3, in some embodiments the structural support member 50 can comprise fiberglass. In such embodiments, the structural support member 50 can comprise a spar 51 and one or more spar caps such as an upper spar cap 52 and a lower spar cap 53. The spar 51, the upper spar cap 52 and the lower spar cap 53 may extend for any length of the rotor blade span length 32 sufficient to support the overall wind turbine rotor blade 16. For example, in some embodiments the spar 51, the upper spar cap 52 and the lower spar cap 53 may extend substantially the entire length of the rotor blade span length 32 from the root 20 to the tip 22. In some embodiments, the spar 51, the upper spar cap 52 and the lower spar cap 53 may only extend for a portion of the rotor blade span length 32. In even some embodiments, the spar 51, the upper spar cap 52 and the lower spar cap 53 may extend for different lengths independent of one another such as when the upper spar cap 52 and the lower spar cap 53 extend for a length beyond the spar 51 towards the tip 22. Moreover, while embodiments comprising the spar 51, the upper spar cap 52 and the lower spar cap 53 have been presented herein, it should be appreciated that other embodiments may also be provided for structural support members comprising fiberglass such as comprising only one of these elements and/or comprising additional elements not already described herein.

In other embodiments, such as that illustrated in FIG. 4, the structural support member 50 may comprise a carbon fiber. In such embodiments, the structural support member 50 may comprise a single spar 51 (i.e., without the additional upper spar cap 52 and lower spar cap 53 illustrated in FIG. 3) which comprises the carbon fiber material. While specific materials have been presented herein, it should also be appreciated that additional and/or alternative materials may also be incorporated into the structural support member 50. Moreover, while embodiments comprising the spar 51 have been presented herein, it should be appreciated that other embodiments may also be provided for structural support members comprising carbon fiber such as comprising an upper spar cap, a lower spar cap and/or additional elements not already described herein.

Referring now to FIGS. 3 and 4, the wind turbine rotor blade 16 may further comprise one or more cavities 60 internal the wind turbine rotor blade 16. The one or more cavities 60 can comprise voids in the interior of the wind turbine rotor blade 16 that are not filled with structural support members 50 or other components of the wind turbine rotor blade 16. For example, in some embodiments there may be a leading edge cavity 61 adjacent the leading edge 28 of the wind turbine rotor blade 16. In some embodiments, there may additionally or alternatively be a trailing edge cavity 61 adjacent the trailing edge 30 of the wind turbine rotor blade 16. In other embodiments, additional and/or alternative cavities 60 may also be present internal the wind turbine rotor blade 16 such as near or around the structural support member 50. Moreover, in some embodiments, one or more of the cavities 60, such as the leading edge cavity 61 or the trailing edge cavity 62, may be divided into a plurality of sub cavities such that all or part of the cavity 60 may filled with radar absorbing materials as will become appreciated herein.

To assist in the reduction of the radar cross section of the wind turbine rotor blade 16 at one or more locations, in some embodiments the wind turbine rotor blade 16 may comprise a lightweight broadband radar absorbing filler material 70 disposed in at least one of the one or more cavities 60. The lightweight broadband radar absorbing filler material 70 may comprise a relatively lightweight material that does not substantially affect the weight or balance of the wind turbine rotor blade 16 and is also capable of absorbing radar across a relatively broadband spectrum such that the radar cross section of the wind turbine rotor blade 16 can be reduced for a plurality of frequencies. As used herein, broadband spectrum refers to a frequency range spanning at least about 0.5 GHz, and in some embodiments at least about 1.0 GHz, such that the lightweight broadband radar absorbing filler material 70 is capable of reducing the radar cross section of at least a portion of the wind turbine rotor blade 16 across a range in frequency.

The lightweight broadband radar absorbing filler material 70 can comprise a foam matrix 71 and a plurality of carbon bodies 72 (or similar material having electromagnetic energy attenuation characteristics) dispersed throughout the foam matrix 71, such as provided in a lossy foam. In some embodiments, the foam matrix 71 may comprise open cell polyurethane foam that can support the plurality of carbon bodies 72. Such foam materials may allow for the dispersed incorporation of the electromagnetic energy attenuating material (e.g., carbon bodies 72) while not weighing down the wind turbine rotor blade 16 such that the wind turbine 10 would require redesign to maintain its functionality.

The individual carbon bodies 72 may vary in their relative size, shape and/or amount of electromagnetic energy attenuating material and may be either uniformly or variably distributed throughout the foam matrix 71. For example, in some embodiments, the lightweight broadband radar absorbing filler material 70 can comprise a variable carbon loaded material wherein the amount of carbon in the lightweight broadband radar absorbing filler material 70 is non-uniform. The non-uniformity of the carbon loading may be a result of the number or concentration of carbon bodies 72 disposed in a certain region of the foam matrix 71, the size of the carbon bodies 72 disposed in a certain region of the foam matrix 71, or combinations thereof. By varying the amount and/or location of electromagnetic energy attenuating material, the lightweight broadband radar absorbing filler material 70 may reduce the radar cross section of at least a portion of the wind turbine rotor blade 16 by attenuating electromagnetic energy across a broad spectrum. For example, in some embodiments, the lightweight broadband radar absorbing filler material 70 can comprise one or more of the commercially available 320 series of carbon-based foam absorbers manufactured by Cuming Microwave.

The lightweight broadband radar absorbing filler material 70 may be incorporated into wind turbine rotor blades 16 comprising various structural support member 50 configurations and/or materials. For example, the lightweight broadband radar absorbing filler material 70 may be disposed in one or more cavities 60 when the wind turbine rotor blade 16 comprises fiberglass (such as when it comprises a spar 51, upper spar cap 52 and lower spar cap 53 as illustrated in FIG. 3). Alternatively, the lightweight broadband radar absorbing filler material 70 may be disposed in one or more cavities 60 when the wind turbine rotor blade 16 comprises carbon fiber (such as when it comprises a single spar 51 comprising as illustrated in FIG. 4). While specific locations and configurations of the lightweight broadband radar absorbing filler material 70 have been identified herein, it should be appreciated that these are exemplary only; additional or alternative combinations/configurations of wind turbine rotor blades 16 and lightweight broadband radar absorbing filler materials 70 should be appreciated.

Furthermore, still referring to FIGS. 3 and 4, the lightweight broadband radar absorbing filler material 70 may be disposed in a variety of locations in and around the wind turbine rotor blade 16 to reduce the radar cross section across a relatively broadband spectrum of radar frequency as appreciated herein. For example, the lightweight broadband radar absorbing filler material 70 can be disposed in at least one of the one or more cavities 60 of the wind turbine rotor blade 16. Depending in part on the size, shape and position of the specific cavity 60, the lightweight broadband radar absorbing filler material 70 may be incorporated such that it fills just a portion of the cavity 60 (as illustrated in FIGS. 3 and 4), or fills the entirety of the cavity 60. In some embodiments, the lightweight broadband radar absorbing filler material 70 may be disposed in a cavity 60 adjacent to wherever adhesive is present. For example, the lightweight broadband radar absorbing filler material 70 may be disposed in the leading edge cavity 61 and/or the trailing edge cavity 62 such that the incorporation of a single lightweight broadband radar absorbing filler material 70 can reduce the radar cross section of at least a portion of the wind turbine rotor blade 16 even though the amount of adhesive may vary by location or by blade.

The broadband aspect of the lightweight broadband radar absorbing filler material 70 may thereby be utilized to reduce the radar cross section for a variety of radar band frequency ranges (such as those used in North America and Europe) via the incorporation of a single element to provide greater flexibility for where the wind turbine rotor blade 16 is deployed. Moreover, the broadband aspect may also allow for the reduction in radar cross section of at least a portion of the wind turbine rotor blade 16 when the local structure of the wind turbine rotor blade 16 requires the reduction of radar cross section across more than a single frequency. For example, the variable amount of adhesive utilized in the leading edge 28 and/or the trailing edge 30 of the shell 40 may produce a radar cross section that varies based on adhesive thickness. A single lightweight broadband radar absorbing filler material 70 may thereby assist in reducing the radar cross section of the entire adhesive structure despite its varying thickness.

Figure 5:
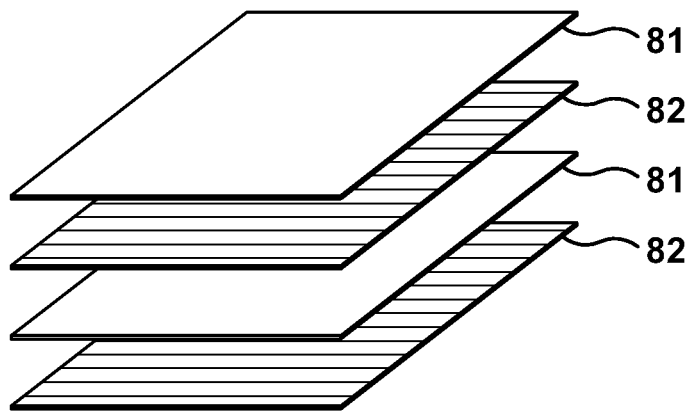
FIG. 5 is an exploded view of a plurality of stacked resistive layers according to one or more embodiments shown or described herein.
Figure 6:
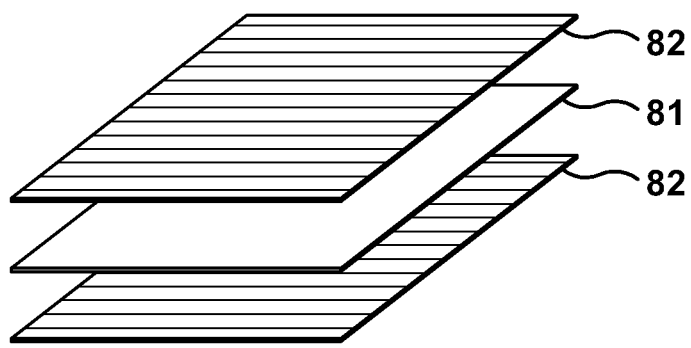
FIG. 6 is an exploded view of an individual resistive layer according to one or more embodiments shown or described herein.

Referring now to FIGS. 4-6, to assist in the reduction of the radar cross section of the wind turbine rotor blade 16 at one or more locations, the wind turbine rotor blade 16 may alternatively or additionally comprise a plurality of stacked resistive layers 80 (such as for fiberglass blades as illustrated in FIG. 3) or may comprise a single resistive layer 81 (such as for carbon fiber blades as illustrated in FIG. 4). As used herein, it should be appreciated that "resistive layer" includes both resistive layers and impedance layers.

Referring specifically to FIGS. 3 and 5, the plurality of stacked resistive layers 80 may be incorporated into wind turbine rotor blades 16 having structural support members 50 comprising fiberglass. The plurality of stacked resistive layers 80 may comprise two or more individual resistive layers 81, each separated by one or more ply layers 82, which act in cooperation to absorb radar energy by converting it to heat. The plurality of stacked resistive layers 80 may be disposed at one or more locations about the structural support member 50 comprising fiberglass and optionally the shell 40. Moreover, the plurality of stacked resistive layers 80 may potentially be relatively tuned to different specific frequencies at different locations.

The plurality of stacked resistive layers 80 can comprise any plurality of individual resistive layers 81 spaced to reduce the radar cross section around one or more particular frequencies. In some embodiments, the individual resistive layers 81 may comprise, for example, a material with continuous carbon loading. In some embodiments, the individual resistive layers 81 may comprise circuit analog layers wherein the layers comprise a radar absorbing circuit. Such circuit analog layers may be capable of more precise tuning for absorbing radar of a particular frequency. In some embodiments, the individual resistive layers 81 of the plurality of stacked resistive layers 80 may comprise a variety of different types of resistive layers 81, such as where some comprise circuit analog layers and other comprise material with continuous carbon loading. Moreover, the plurality of stacked resistive layers 80 can comprise any number of individual resistive layers 81. For example, in some embodiments the plurality of stacked resistive layers 80 may comprise 2 resistive layers 81. In some embodiments, the plurality of stacked resistive layers 80 may comprise up to 20 resistive layers 81. The individual resistive layers 81 may be spaced apart at constant or varying distances by one or more ply layers 82. Each ply layer 82 may comprise a thickness, such as about 10 mm, to separate the adjacent resistive layers 81. In some embodiments, the spacing may be greater or smaller and may depend on the size of the ply layer 82 between the resistive layers 81.

Referring to FIG. 3, as discussed above, the plurality of stacked resistive layers 80 may be disposed in a variety of locations in and around the fiberglass supported wind turbine rotor blade 16 to reduce its radar cross section across one or more frequencies. For example, in one embodiment, the plurality of stacked resistive layers may be disposed at one or more locations about the structural support member 50 of the wind turbine rotor blade 16. In such embodiments, the plurality of stacked resistive layers 80 may be disposed such that they are integrated with the structural support member 50 (e.g., alternating layers of fiberglass and resistive layers) and/or they may be disposed such that they are stacked on the exterior of the structural support member 50. Additionally, in some embodiments the plurality of stacked resistive layers 80 may be disposed at one or more locations about the shell 40 of the wind turbine rotor blade 16. In such embodiments, the plurality of stacked resistive layers 80 may be disposed such that they are integrated with the shell 40 (e.g., alternating layers of fiberglass and resistive layers) and/or they may be disposed such that they are stacked on the exterior or interior of the shell 40. While specific locations and configurations of the plurality of stacked resistive layers 80 have been identified herein, it should be appreciated that these are exemplary only. Additional or alternative combinations and/or configurations of wind turbine rotor blades 16 and plurality of stacked resistive layers 80 should be appreciated.

Since the plurality of stacked resistive layers 80 may be tuned to target specific frequencies (such as by varying the type of resistive layer and/or the distances there between), a single wind turbine rotor blade 16 may have a reduced radar cross section for one or more frequencies. For example, if it is known where the wind turbine rotor blade 16 will be deployed and what radar frequencies it will experience, than one or more plurality of stacked resistive layers may be disposed about the wind turbine rotor blade 16 tuned for that particular frequency. Conversely, if the wind turbine rotor blade 16 is manufactured before it is known where it will be deployed, the specific frequencies of incident radar may not be known. Therefore, in some embodiments, different pluralities of stacked resistive layers 80 may be disposed about the wind turbine rotor blade 16 such that different frequencies can be targeted. For example, a first plurality of stacked resistive layers 80 may be disposed about the structural support member 50 that is tuned for frequencies most prominent in North America. A second plurality of stacked resistive layers 80 may then be disposed about the shell 40 that is tuned for frequencies most prominent in Europe. Thus, the same wind turbine rotor blade 16 may be deployed in either geographical area and still possess a reduced radar cross section for whichever frequency of radar it is subjected to. Such embodiments may streamline manufacturing and provide more versatile blades for broader deployment.

Referring now to FIGS. 4 and 6, individual resistive layers 81 (without stacking) may be incorporated into one or more different locations of wind turbine rotor blades 16 having structural support members 50 comprising carbon fiber. The individual resistive layers 81 may comprise a resistive sheet disposed about the shell 40 and positioned to reduce the radar cross section with respect to the scattering that can occur from the large carbon fiber structural support member 50.

Specifically, in some embodiments, an individual resistive layer 81 may be positioned between the structural support member 51 and the leading edge 28. Such embodiments may allow for the absorption of radar energy scattered from the structural support member 51 proximate the leading edge 28. Alternatively or additionally, in some embodiments, an individual resistive layer 81 may be positioned between the structural support member 51 and the trailing edge 30. Such embodiments may allow for the absorption of radar energy scattered from the structural support member 51 proximate the trailing edge 30. Moreover, the individual resistive layers 81 may be disposed on the inside of the shell 40, on the inside of the shell 40, or integral with the shell 40. For example, as illustrated in FIG. 6, the shell 40 may comprise a plurality of ply layers 82 such that the individual resistive layer 81 is disposed between two of said ply layers 82.

Furthermore, in some embodiments the individual resistive layers 81 may comprise a tapered resistance such that the individual resistive layer 81 has a lower resistance proximate the structural support member 50 and a higher resistance proximate the leading edge 28 or trailing edge 30. The tapered resistance can help absorb radar energy across a broader range to better reduce the overall radar cross section that can result from the scattering off of the structural support member 51 comprising carbon fiber.

It should now be appreciated that lightweight broadband radar absorbing filler material and/or one or more resistive layers may be incorporated into a wind turbine rotor blade to reduce its radar cross section. The incorporation of such materials can provide radar cross section reduction over one or more frequencies while not imposing significant additional physical constraints to the wind turbine rotor blade. For example, by incorporating one or more of the radar cross section reduction features disclosed and described herein, the radar cross section of the wind turbine rotor blade may be reduced by at least 20 dB, or potentially even 25 dB, to better allow for placement near or around radar towers. Such wind turbine rotor blades may thereby be utilized in a variety of geographical regions (that use different radar bands) without requiring unique customization for its targeted deployment.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A wind turbine rotor blade comprising:
a shell comprising a leading edge opposite a trailing edge;
a structural support member that supports the shell and is disposed internal the wind turbine rotor blade between the leading edge and the trailing edge and extends for at least a portion of a rotor blade span length, wherein the structural support member comprises fiberglass;
one or more cavities internal the wind turbine rotor blade; and,
a lightweight broadband radar absorbing filler material disposed in at least one of the one or more cavities to provide a reduced radar cross section.

2. The wind turbine rotor blade of claim 1, wherein the lightweight broadband radar absorbing filler material comprises a lossy foam.

3. The wind turbine rotor blade of claim 1, wherein the lightweight broadband radar absorbing filler material comprises a variable carbon loaded material wherein the amount of carbon in the lightweight broadband radar absorbing filler material is non-uniform.

4. The wind turbine rotor blade of claim 1, wherein the leading edge comprises an adhesive and the lightweight broadband radar absorbing filler material is disposed in a leading edge cavity adjacent the leading edge.

5. The wind turbine rotor blade of claim 4, wherein the adhesive comprises a non-uniform thickness.

6. The wind turbine rotor blade of claim 1, wherein the trailing edge also comprises an adhesive and lightweight broadband radar absorbing filler material is also disposed in a trailing edge cavity adjacent the trailing edge.

7. The wind turbine rotor blade of claim 1, wherein the lightweight broadband radar absorbing filler material at least partially absorbs radar across a frequency range spanning at least about 0.5 GHz.

8. The wind turbine rotor blade of claim 7, wherein the frequency range spans at least about 1.0 GHz.

9. The wind turbine rotor blade of claim 1, wherein the structural support member comprises a spar disposed between an upper spar cap and a lower spar cap.

10. The wind turbine rotor blade of claim 1 further comprising a plurality of stacked resistive layers disposed at one or more locations about the wind turbine rotor blade to further provide the reduced radar cross section.

11. The wind turbine rotor blade of claim 10, wherein at least one of the plurality of stacked resistive layers is disposed about the structural support member.

12. The wind turbine rotor blade of claim 10, wherein at least one of the plurality of stacked resistive layers is disposed about the shell.

13. A wind turbine rotor blade comprising:
a shell comprising a leading edge opposite a trailing edge;
a structural support member that supports the shell and is disposed internal the wind turbine rotor blade between the leading edge and the trailing edge and extends for at least a portion of a rotor blade span length, wherein the structural support member comprises fiberglass; and,
a plurality of stacked resistive layers disposed at one or more locations about the structural support member to provide a reduced radar cross section, wherein the plurality of stacked resistive layers comprise one or more ply layers disposed between each resistive layer, and wherein the structural support member comprises the one or more ply layers such that the plurality of stacked resistive layers are integral with the structural support member.

14. The wind turbine rotor blade of claim 13, wherein the plurality of stacked resistive layers consists of about 2 to about 20 individual resistive layers.

15. The wind turbine rotor blade of claim 13, wherein at least one of the plurality of stacked resistive layers comprises a circuit analog layer.

16. The wind turbine rotor blade of claim 13, wherein a first plurality of stacked resistive layers is disposed at a first location, and a second plurality of stacked resistive layers is disposed at a second location.

17. The wind turbine rotor blade of claim 16, wherein the first plurality of stacked resistive layers at least partially absorbs radar in the 1 GHz to 2 GHz spectrum and the second plurality of stacked resistive layers at least partially absorbs radar in the 2 GHz to 4 GHz spectrum.

18. The wind turbine rotor blade of claim 16, wherein the first location comprises the structural support member and the second location comprises the shell.

19. A wind turbine rotor blade comprising:
a shell comprising a leading edge opposite a trailing edge;
a structural support member that supports the shell and is disposed internal the wind turbine rotor blade between the leading edge and the trailing edge and extends for at least a portion of a rotor blade span length, wherein the structural support member comprises fiberglass; and,
a plurality of stacked resistive layers disposed at one or more locations about the structural support member to provide a reduced radar cross section, wherein a first plurality of stacked resistive layers is disposed at a first location, and a second plurality of stacked resistive layers is disposed at a second location, and wherein the first location comprises the structural support member and the second location comprises the shell.

* * * * *